United States Patent
Hsu

(10) Patent No.: US 7,848,410 B2
(45) Date of Patent: Dec. 7, 2010

(54) VIDEO DECODING METHODS AND DEVICES

(75) Inventor: Wen-Hao Hsu, Kaoshiung (TW)

(73) Assignee: Institute for Information Industry, Daan Chiu, Taipei (TW)

( * ) Notice: Subject to any disclaimer, the term of this patent is extended or adjusted under 35 U.S.C. 154(b) by 1563 days.

(21) Appl. No.: 11/018,970

(22) Filed: Dec. 21, 2004

(65) Prior Publication Data

US 2006/0083306 A1   Apr. 20, 2006

(30) Foreign Application Priority Data

Oct. 20, 2004   (TW) .............................. 93131799 A

(51) Int. Cl.
*H04B 1/66* (2006.01)
*H04N 7/12* (2006.01)
*H04N 11/02* (2006.01)
*H04N 11/04* (2006.01)

(52) U.S. Cl. ............................ 375/240.12; 375/240.15; 375/240.25

(58) Field of Classification Search ............ 375/240.12, 375/240.15, 240.25
See application file for complete search history.

(56) References Cited

U.S. PATENT DOCUMENTS

| | | | | |
|---|---|---|---|---|
| 5,621,464 A | * | 4/1997 | Teo et al. .................. | 348/390.1 |
| 5,909,224 A | * | 6/1999 | Fung .......................... | 345/531 |
| 5,978,509 A | * | 11/1999 | Nachtergaele et al. ...... | 382/236 |
| 6,983,017 B2 | * | 1/2006 | Chen et al. ............. | 375/240.12 |
| 6,993,251 B1 | * | 1/2006 | Phillips et al. .............. | 386/125 |
| RE39,455 E | * | 1/2007 | Tan ........................ | 375/240.15 |
| 2005/0123046 A1 | * | 6/2005 | Wang et al. ............ | 375/240.15 |

* cited by examiner

*Primary Examiner*—Marsha D Banks Harold
*Assistant Examiner*—Jessica Roberts
(74) *Attorney, Agent, or Firm*—Thomas, Kayden, Horstemeyer & Risley

(57) ABSTRACT

A video decoding method. The first frame of video data is acquired, the first frame is assigned to the backward reference frame and the forward reference frame respectively, and a frame buffer is emptied. Next, the next frame of the video data is acquired, and frame type is then determined. If the frame is a B-frame, corresponding decoding operations are implemented according to the determining result, and the frame is temporarily stored in the frame buffer.

13 Claims, 6 Drawing Sheets

Input Bitstream Data : I(0) P(1) B(2) P(3) B(4) Pe(5) B(6) I(7) B(8)

Output Bitstream Data : x I(0) B(2) P(1) B(4) P(3) B(6) P(3) B(8) I(7)

FIG. 6A

Input Bitstream Data : I(0) PB(1) B(2) Pe(3) PB(4) B(5) Pe(6) I(7) PB(8) B(9) Pe(10)

Output Bitstream Data : x I(0) B(1) B(2) P(1) B(4) P(4) I(7) B(8) B(9) P(8)

FIG. 6B

VIDEO DECODING METHODS AND DEVICES

BACKGROUND

The invention relates to video processing methods, especially to video decoding method for decoding video data encoded using different encoding methods.

MPEG-4 is an ISO/IEC standard developed by MPEG (Moving Picture Experts Group), the committee that also developed the Emmy Award winning standards known as MPEG-1 and MPEG-2. MPEG-4 is the successor to MPEG-1 and MPEG-2 video standards. ISO standard committee implemented this standard in 1998. Instead of using current frame-based video technology, it adopts the object-oriented concept, which integrates existing multimedia technologies, such as 2D/3D graphic, animation, video codec, multimedia streaming, interactive, and programmatic environments into a single architecture.

The following describes video processing based on MPEG-4 format images.

A video stream is a sequence of video frames. Each frame is a still image. A video player displays one frame after another, usually at a rate close to 30 frames per second. Frames are divided into 16×16 pixel macroblocks (not shown). Each macroblock consists of four 8×8 luminance blocks and two 8×8 chrominance blocks (1 U and 1 V) (not shown). Macroblocks are the units for motion-compensated compression. Blocks are used for DCT compression.

Video data complying with MPEG-4 format files is composed of three different types of frames, comprising intra-frames (I-frames), forward predicted frames (P-frames), and bidirectional predicted frames (B-frames). An I-frame is encoded as a single image, with no reference to any past or future frames, referring to the fact that the various lossless and lossy compression techniques are performed relative to information that is contained only within the current frame, and not relative to any other frame in the video sequence. In other words, no temporal processing is performed outside of the current picture or frame. A P-frame is encoded relative to the past reference frame. A reference frame is a P- or I-frame. The past reference frame is the closest preceding reference frame. Each macroblock in a P-frame can be encoded either as an Intra-macroblock or as a Inter-macroblock. An Intra-macroblock is encoded just like a macroblock in an I-frame which is encoded with no reference. A B-frame is encoded relative to the past reference frame, the future reference frame, or both frames. The future reference frame is the closest following reference frame (I or P). The encoding for B-frames is similar to P-frames, except that motion vectors may refer to areas in the future reference frames. For macroblocks that use both past and future reference frames, the two 16×16 areas are averaged.

As described above, a video stream is a sequence of video frames. An input encoded sequence of video frames, for example, is represented as "I(0) P(3) B(1) B(2) P(6) B(4) B(5) I(9) B(7) B(8) P(12) B(11) P(12)" (the bracketed number is the display order of each frame). The output decoded sequence of the video frames is then represented as "I(0) B(1) B(2) P(3) B(4) B(5) P(6) B(7) B(8) I(9) B(10) B(11) P(12)".

Video data can be further composed of combined frames, each comprising both a P-frame and a B-frame or an I-frame and a B-frame, and empty frames ($P_e$) Referring to FIG. 1, which shows a schematic diagram of a combined frame 100 (regarded as one frame to be introduced in the video data), comprising a P-frame and a B-frame, encoding processes of each frame are identical to independent ones. $P_e$ frames indicate predicted frames not comprising video data.

The foregoing descriptions explain the types of frames of video data and input and output sequences in a video stream. Video data translated into playable video files must be encoded as MPEG-1/2/4, AVI, or other video formats due to the considerable file size. MPEG-4 video standards, however, are qualifiable based on MPEG-4 system layers, and vendors develop their coders/decoders (CODECs) based individual requirements, such that video data encoded by one CODEC cannot be correctly decoded by other CODECs. DivX and Divio are popular encoding and decoding applications, utilizing MPEG-4 encoding standards to encode video images with a high compression rate, resulting in high image quality closest to MPEG-2 file format and low file size closest to MPEG-1 file format.

Although the described CODECs claim to comply with MPEG-4 standards, their sampling synchronization mechanisms and output video sequences (as described above) are somewhat different, causing encoded video streams to be incompatible with each other. Some CODECs capable of decoding both of the described video sequences construct two decoding models for one video data and then determine whether the video data is encoded by Divx or Divio according to copyright information thereof. Such methods are not only time-consuming but also fail when the copyright information is modified or lost during decoding processes.

Thus, a video decoding method capable of correctly decoding video data encoded by any CODEC is desirable.

SUMMARY

Video decoding methods are provided. In an embodiment of such a method, a first frame of video data is acquired, the first frame is assigned to the backward reference frame and the forward reference frame respectively (indicating the acquired frame is stored in a backward reference buffer and a forward reference buffer respectively), and a frame buffer is emptied. The next frame of the video data is acquired, and the frame type is then determined. Corresponding decoding operations are implemented according to the determined result, and if the frame is a B-frame, the frame is temporarily stored in the frame buffer.

If the frame is an I-frame or a P-frame, the decoded backward reference frame is output. The backward reference frame is then assigned to the forward reference frame, the current frame is decoded and assigned to the backward reference frame, and the frame buffer is emptied.

If the frame is a B-frame, it is determined whether the frame buffer has a previously stored B-frame. If the so, the previously stored B-frame is decoded and output, and then the current frames will be stored in the frame buffer. If no previously stored B-frame is present in the frame buffer, the frame is decoded and output.

If the frame is a combined frame comprising both a P-frame and a B-frame or an I-frame and a B-frame, the decoded backward reference frame is output. The backward reference frame is then assigned to the forward reference frame, the first frame of the combined frame is decoded and assigned to the backward reference frame, and the other of the combined frame is stored in the frame buffer.

If the frame is a P-frame not comprising video data (empty frames, $P_e$) it is determined whether the frame buffer has a previously stored B-frame. If so, the previously stored B-frame is decoded and output, and the frame buffer is emptied. If not, the decoded backward reference frame is output.

BRIEF DESCRIPTION OF THE DRAWINGS

Video encoding methods and devices can be more fully understood by reading the subsequent detailed description and examples of embodiments thereof with reference made to the accompanying drawings, wherein:

FIG. 6A is a schematic diagram illustrating the details of an embodiment of a video encoding method; and FIG. 6B is a schematic diagram illustrating the details of another embodiment of a video encoding method.

DETAILED DESCRIPTION

Embodiments of the invention disclose video decoding methods and devices. Some parameters are first defined for use in Figures regarding to the following embodiments of the invention. With to programming concepts, "Current" refers to a current acquired video data frame pointer, "Next" refers to a backward reference frame pointer, "Previous" refers to a forward reference frame pointer, and "Buffer" refers to a buffer pointer. Next, "GetNextSample( )" refers to a sub-function for acquiring the next frame of the video data, "Dump( )" refers to a sub-function for outputting a frame, "GetFirstFrame( )" refers to a sub-function for acquiring the first frame of a combined frame, and "GetSecondFrame( )" refers to a sub-function for acquiring the other frame (the second frame) of the combined frame. Additionally, a backward reference buffer and a forward reference buffer are provided in accordance with MPEG video standards, in which a frame to which the backward or forward reference frame pointer points (indicating an acquired frame is assigned to a backward or forward reference frame) will be stored in the backward or forward reference buffer, and such connections therebetween will not give unnecessary details.

As described above, conventional CODECs (such as Divio and Divx) uses different decoding rules and are capable of decoding different types of frames, causing video data encoded by one CODEC cannot be correctly decoded by other CODECs. For decoded frames, Divio can decode I, P, B, and $P_e$ frames, while Divx can further decode a combined frame comprising both a P-frame and a B-frame or an I-frame and a B-frame.

Figure 1:
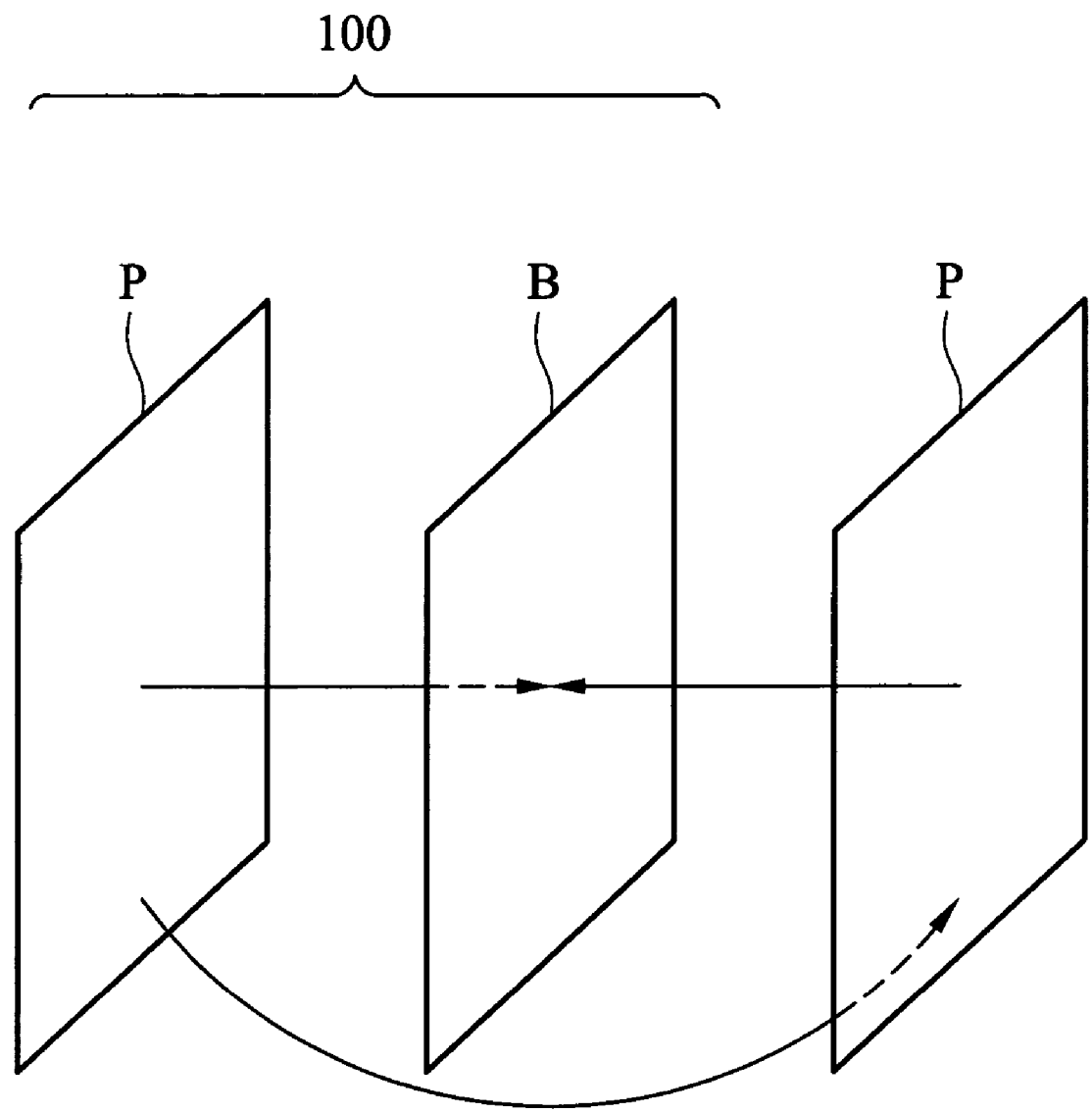
FIG. 1 is a schematic view of a combined frame comprising a P-frame and a B-frame.
Figure 2:
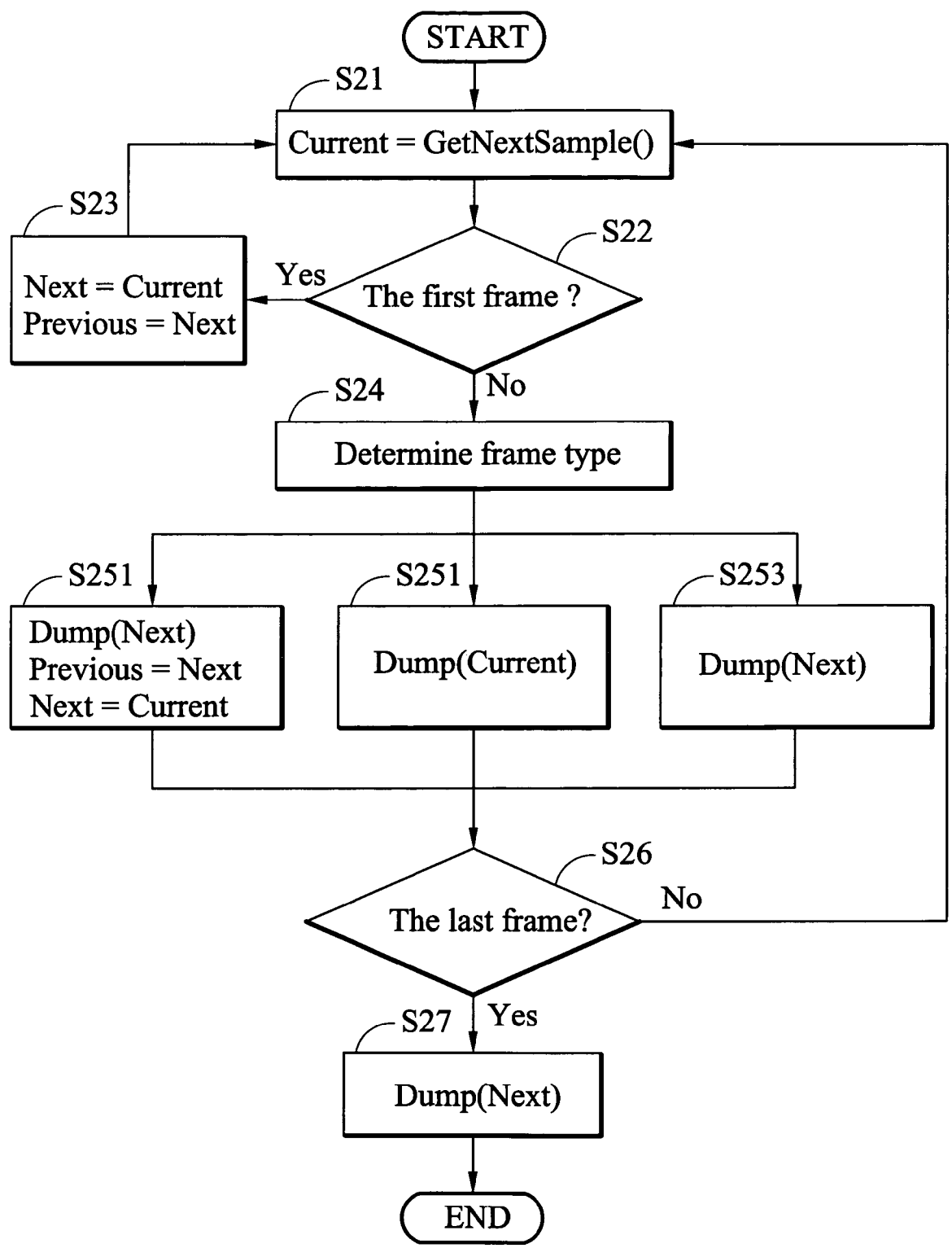
FIG. 2 is a flowchart of image processing for Divio.

Referring to Divio image processing, as shown in FIG. 2, a frame of video data is acquired (Current=GetNextSample( )) (step S21) and it is determined whether the frame is the first frame of the video data (step S22). If the frame is the first frame of the video data, it is assigned to a backward reference frame and a forward reference frame respectively (Next=Current & Previous=Next) (step S23). If the frame is not the first frame of the video data, the frame type is determined (step S24) and corresponding decoding operations are implemented according to the determined result.

If the frame is an I-frame or a P-frame, the decoded backward reference frame is output (Dump(Next)), the backward reference frame is assigned to the forward reference frame (Previous=Next), and the current acquired frame (I or P frame) is assigned to the backward reference frame (Next=Current) (step S251). If the frame is a B-frame, it is decoded and output (Dump(Current)) (step S252). If the frame is a $P_e$ frame, the backward reference frame is output (Dump(Next)) (step S253). Finally, the frame stored in the backward reference buffer is output (Dump(Next)) after all the frames are completely decoded and output (steps S26 and S27).

Figure 3:
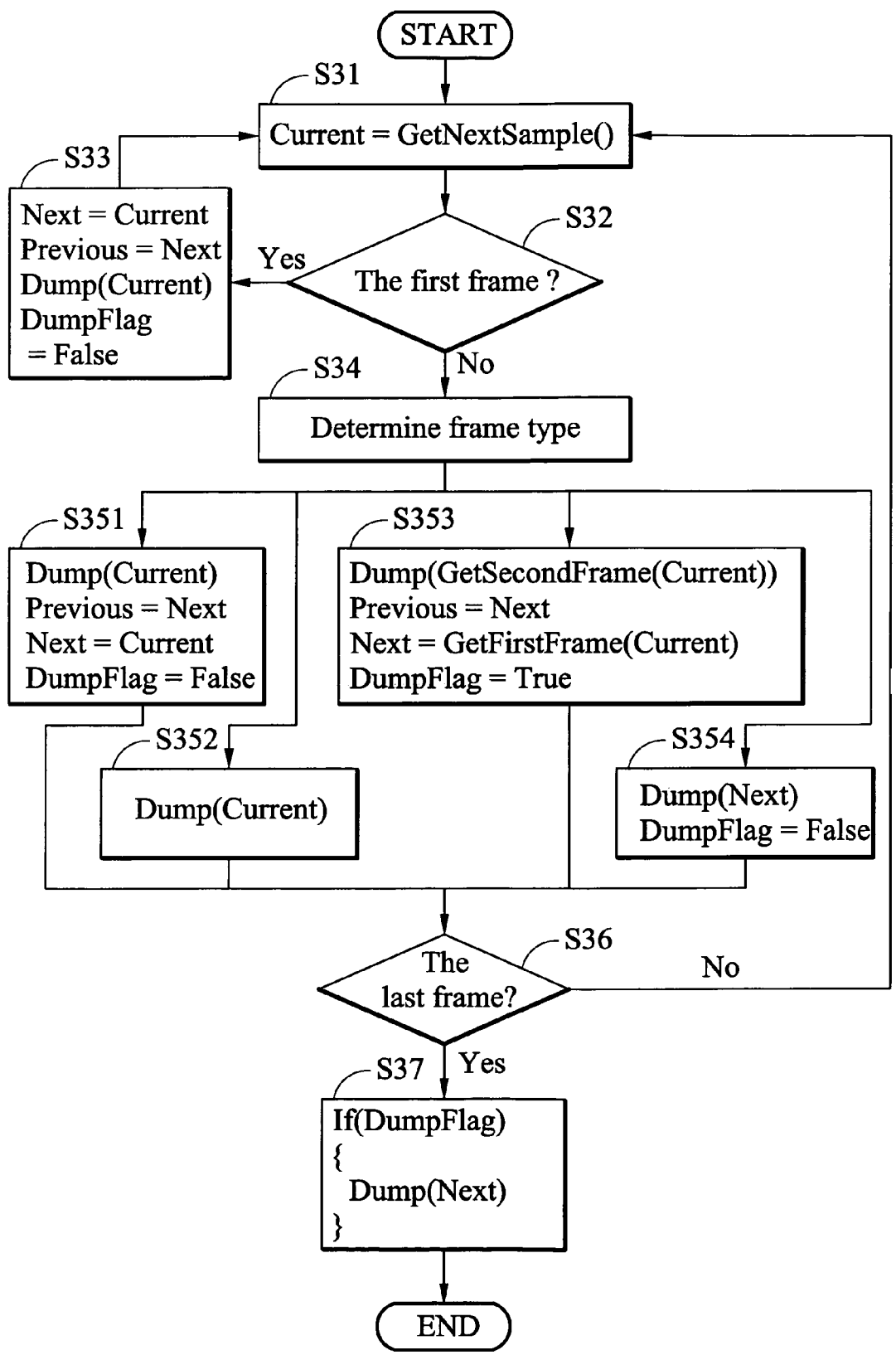
FIG. 3 is a flowchart of image processing for Divx.

Referring to Divx image processing, as shown in FIG. 3, a video data frame is acquired (Current=GetNextSample( )) (step S31) and it is determined whether the frame is the first frame of the video data (step S32). If the frame is the first frame of the video data, it is assigned to a backward reference frame and a forward reference frame respectively (Next=Current & Previous=Next), the frame is decoded and output (Dump(Current)), and a dump_flag is set to false (DumpFlag=0) (step S33). If the frame is not the first frame of the video data, the frame type is determined (step S34) and corresponding decoding operations are implemented according to the determined result.

If the frame is an I-frame or a P-frame, the frame is decoded and output (Dump(Current)), the backward reference frame is assigned to the forward reference frame (Previous=Next), the current acquired frame (I or P frame) is assigned to the backward reference frame (Next=Current), and the dump_flag is set to false (DumpFlag=0) (step S351). If the frame is a B-frame, it is decoded and output (Dump(Current)) (step S252). If the frame is a combined frame, the second frame thereof is decoded and output (Dump(GetSecondFrame(Current))), the backward reference frame is assigned to the forward reference frame (Previous=Next), the first frame of the combined frame is assigned to the backward reference frame (Next=GetFirstFrame(Current)), and the dump_flag is set to true (DumpFlag=1) (step S353). If the frame is a $P_e$ frame, the decoded backward reference frame is output (Dump(Next)), and the dump_flag is set to false (DumpFlag=0) (step S354). After all the frames are completely decoded and output, if the dump_flag is set to true (DumpFlag=1), the frame stored in the backward reference buffer is decoded and output (Dump (Next)) (steps S36 and S37).

As described above, conventional CODECs (such as Divio and Divx) uses different decoding rules capable of decoding different types of frames, causing video data encoded by one CODEC cannot be correctly decoded by other CODECs. Thus, decoding rules provided by embodiments of the invention can solve the above problems. Additionally, embodiments of the invention further provide a frame buffer for temporarily storing a B-frame.

Figure 4:
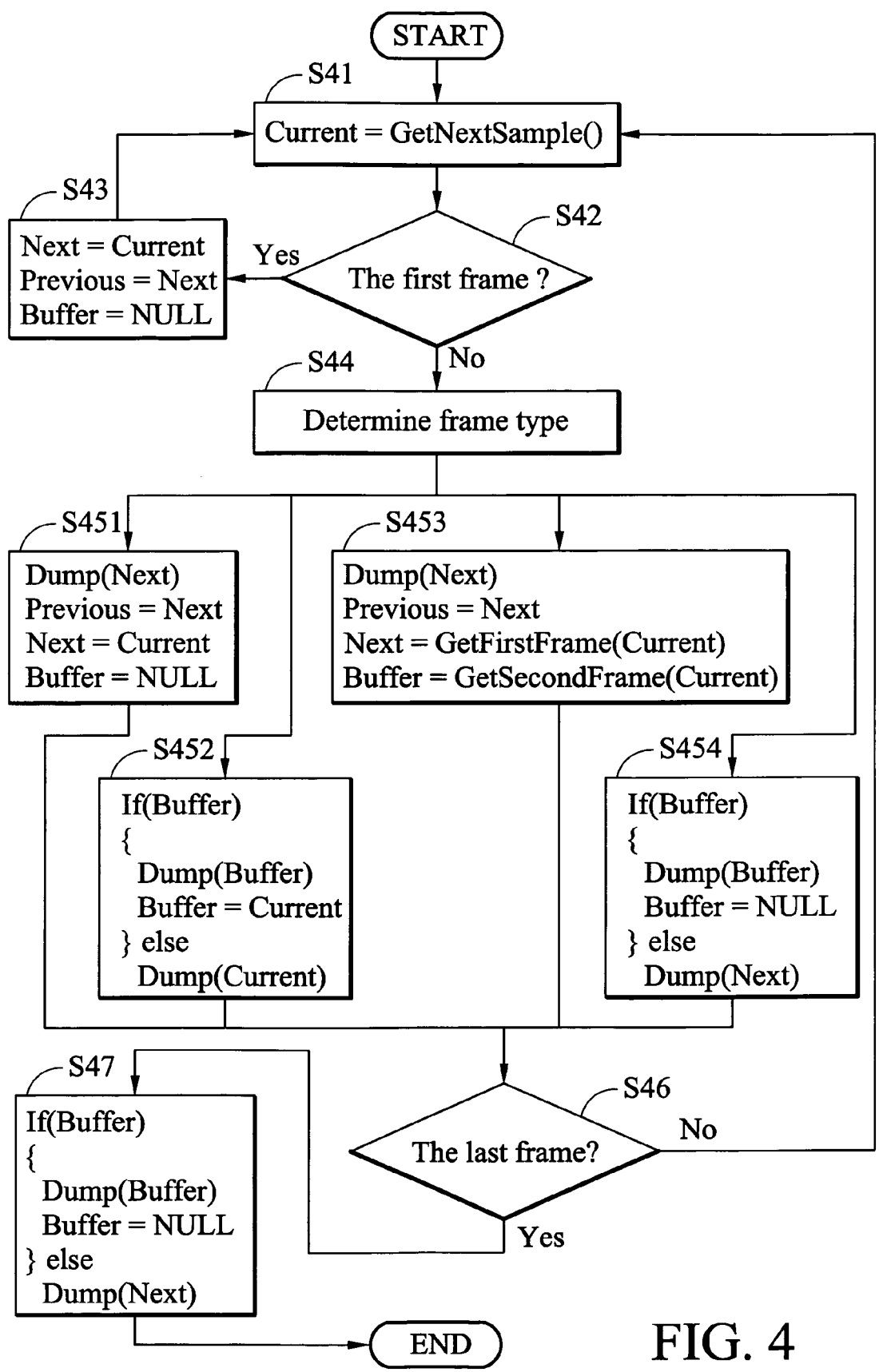
FIG. 4 is a flowchart of an embodiment of a video decoding method.

FIG. 4 is a flowchart of an embodiment of a video decoding method. A frame of video data is acquired (Current=GetNextSample( )) (step S41) and it is determined whether the frame is the first frame of the video data (step S42). If the frame is the first frame of the video data, it is assigned to a backward reference frame and a forward reference frame respectively (Next=Current & Previous=Next), and the frame buffer is emptied (Buffer=NULL) (step S43). If the frame is not the first frame of the video data, frame type is determined (step S44) and corresponding decoding operations are implemented according to the determined result.

If the frame is an I-frame or a P-frame, the decoded backward reference frame is output (Dump(Next)), the backward reference frame is assigned to the forward reference frame (Previous=Next), the frame is decoded and assigned to the backward reference frame (Next=Current), and the frame buffer is emptied (Buffer=NULL) (step S451).

If the frame is a B-frame, it is then determined whether the frame buffer has a previously stored B-frame (If(Buffer)). If the frame buffer has the previously stored B-frame, the previously stored B-frame is decoded and output (Dump (Buffer)), and the frame is stored in the frame buffer (Buffer=Current). If no previously stored B-frame is present in the frame buffer, the frame is decoded and output (Dump (Current)) (step S452).

If the frame is a combined frame comprising both a P-frame and a B-frame or an I-frame and a B-frame, the decoded backward reference frame is output (Dump(Next)). The backward reference frame is then assigned to the forward reference frame (Previous=Next), the first frame of the combined frame is assigned to the backward reference frame (Next=GetFirstFrame(Current)), and the second frame of the combined frame is stored in the frame buffer (Buffer=GetSecondFrame(Current)) (step S453).

If the frame is a $P_e$-frame, it is determined whether the frame buffer has a previously stored B-frame (If(Buffer)). If the frame buffer has the previously stored B-frame, the previously stored B-frame is decoded and output (Dump (Buffer)), and the frame buffer is emptied (Buffer=NULL). If no previously stored B-frame is present in the frame buffer, the decoded backward reference frame is output (Dump(Next)) (step S454).

Next, it is determined whether the current acquired frame is the last frame of the video data (step S46), and, if so, the process proceeds to step S47, and, if not, to step S41 for acquiring the next frame of the video data. If the current acquired frame is the last frame of the video data, indicating all the frames of the video data are completely decoded and output, it is then determined whether the frame buffer has a previously stored B-frame (If(Buffer)). If the frame buffer has a previously stored B-frame, the previously stored B-frame is decoded and output (Dump(Buffer)), and the frame buffer is emptied (Buffer=NULL). Then, the decoded backward reference frame is output (Dump(Next)) (step S47), and the decoding process terminates.

Figure 5:
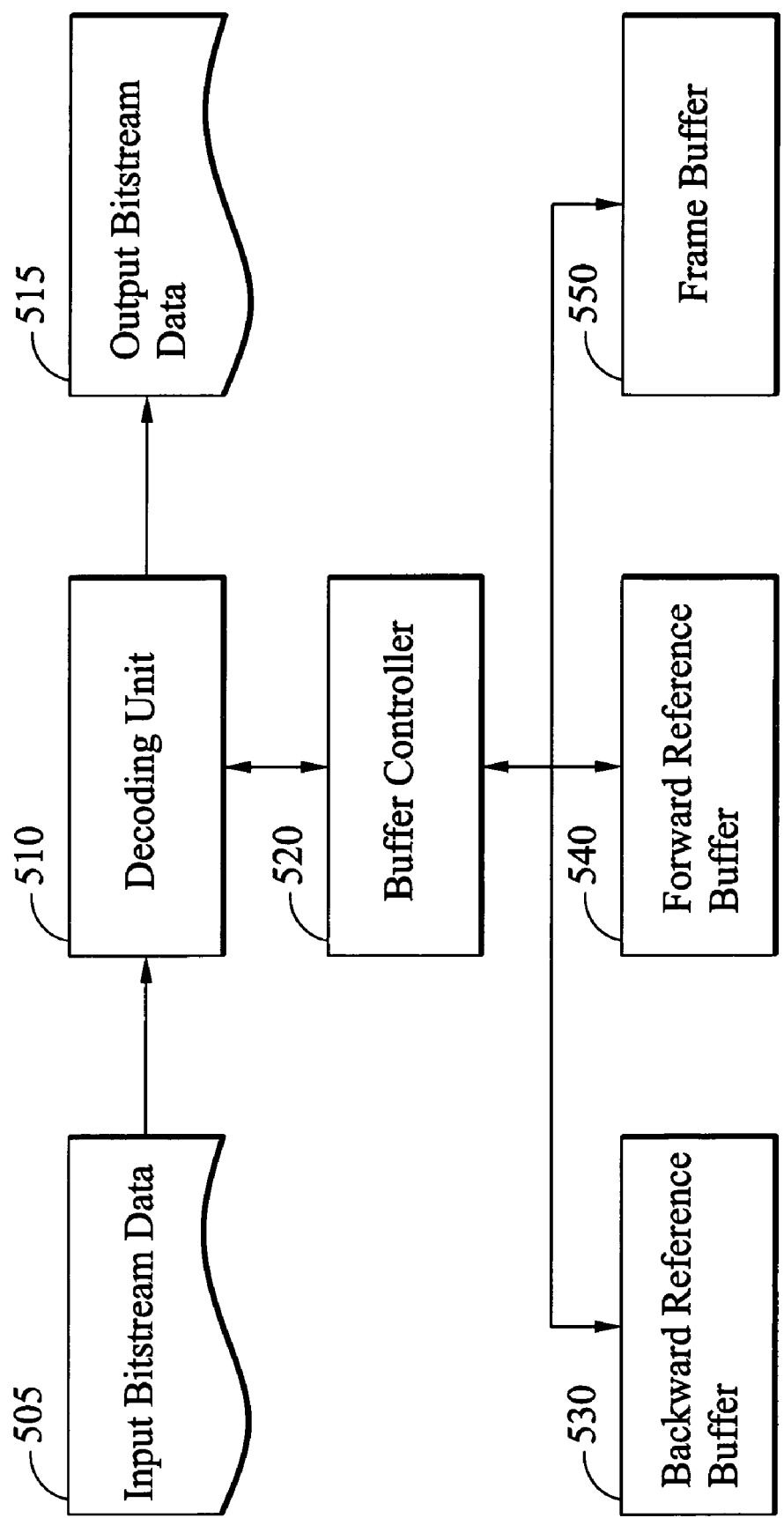
FIG. 5 is a schematic diagram of an embodiment of a video decoding video.

FIG. 5 is a schematic diagram of an embodiment of a video decoding video, comprising a decoding unit 510, a buffer controller 520, a backward reference buffer 530, a forward reference buffer 540, and a frame buffer 550. Decoding unit 510 acquires the first frame (I-frame) of an input bitstream data 505 and buffer controller 520 assigns which to the backward reference frame and forward reference frame respectively (i.e. storing the first frame in backward reference buffer 530 and forward reference buffer 540 respectively). Next, decoding unit 510 acquires the next frame of input bitstream data 505, and determines frame type, implementing corresponding decoding operations according to the determining result.

If the frame is an I-frame or a P-frame, decoding unit 510 decodes and outputs the internal frame of backward reference buffer 530 as an output bitstream data 515. Buffer controller 520 stores the internal frame of backward reference buffer 530 in forward reference buffer 540, stores the frame in backward reference buffer 530, and empties the frame buffer 550.

If the frame is a B-frame, buffer controller 520 determines whether frame buffer 550 has a previously stored B-frame. If frame buffer 550 has a previously stored B-frame, decoding unit 510 decodes and outputs the previously stored B-frame and buffer controller 520 stores the frame in frame buffer 550. If no previously stored B-frame is present in frame buffer 550, decoding unit 510 decodes and outputs the frame.

If the frame is a combined frame comprising both a P-frame and a B-frame or an I-frame and a B-frame, decoding unit 510 decodes and outputs the internal frame of backward reference buffer 530. Buffer controller 520 stores the internal frame of backward reference buffer 530 in forward reference buffer 540, the first frame of the combined frame in backward reference buffer 530, and the second frame of the combined frame in frame buffer 550.

If the frame is a $P_e$-frame, decoding unit 510 determines whether frame buffer 550 has a previously stored B-frame. If frame buffer 550 has a previously stored B-frame, decoding unit 510 decodes and outputs the previously stored B-frame, and buffer controller 520 empties frame buffer 550. If no previously stored B-frame is present in frame buffer 550, the decoding unit 510 decodes and outputs the internal frame of backward reference buffer 530.

FIG. 6A is a schematic diagram illustrating the details of an embodiment of a video encoding method.

Referring to FIG. 6A, an input bitstream data shows "I(0) P(1) B(2) P(3) B(4) $P_e$(5) B(6) I(7) B(8)". According to data rules as described above, when the I(0)-frame (the first frame) is acquired, it is decoded- and assigned to a backward reference frame and a forward reference frame, respectively, not implementing any decoding operation, such that no frame is output (as shown by the "x" symbol). Next, the P(1)-frame is acquired, the backward reference frame (I(0)-frame) is output and is then assigned to the forward reference frame, and the P(1)-frame is decoded and assigned to the backward reference frame. Next, the B(2)-frame is acquired, a frame buffer has no previously stored B-frame at present, so the B(2)-frame is directly decoded and output. Next, the P(3)-frame is acquired, the backward reference frame (P(1)-frame) is output and assigned to the forward reference frame, and the P(3)-frame is decoded and assigned to the backward reference frame.

Next, the B(4)-frame is acquired, the frame buffer has no previously stored B-frame at present, so the B(4)-frame is directly decoded and output. Next, the $P_e$(5)-frame is acquired, the frame buffer has no previously stored B-frame at present, so the backward reference frame (P(3)-frame) is output. Next, the B(6)-frame is acquired, the frame buffer has no previously stored B-frame at present, so the B(6)-frame is directly decoded and output. Next, the I(7)-frame is acquired, the backward reference frame (P(3)-frame) is output and assigned to the forward reference frame, and the I(7)-frame is assigned to the backward reference frame. Finally, the B(8)-frame is acquired, the frame buffer has no previously stored B-frame at present, so the B(8)-frame is directly decoded and output. The B(8)-frame is the last frame of the input bitstream data and the frame buffer has no previously stored B-frame at present. Then the backward reference frame (I(7)-frame) is output, and the decoding process terminates. Thus, an output bitstream data represented as "I(0) B(2) P(1) B(4) P(3) B(6) P(3) B(8) I(7)" is acquired.

FIG. 6B is a schematic diagram illustrating the details of another embodiment of a video encoding method.

Referring to FIG. 6B, an input bitstream data shows "I(0) PB(1) B(2) $P_e$(3) PB(4) B(S) $P_e$(6) I(7) PB(8) B(9) $P_e$(10)". According to data rules as described above, when the I(0)-frame (the first frame) is acquired, it is decoded and assigned to a backward reference frame and a forward reference frame, respectively, not implementing any decoding operation, such that no frame is output (as shown by the "x" symbol). Next, the PB(1)-frame is acquired, the decoded backward reference frame (I(0)-frame) is output and is then assigned to the forward reference frame, the first frame (P(1)-frame) of the PB(1)-frame is decoded and assigned to the backward reference frame, and the second frame (B(1)-frame) of the PB(1)-frame is stored in a frame buffer. Next, the B(2)-frame is acquired and the frame buffer has the previously stored B(1)-frame at present, so the B(1)-frame is decoded and output and the B(2)-frame is stored in the frame buffer.

Next, the $P_e(3)$-frame is acquired and the frame buffer has the previously stored B(2)-frame at present, so the B(2)-frame is decoded and output and the frame buffer is emptied. Next, the PB(4)-frame is acquired, the decoded backward reference frame (P(1)-frame) is output and assigned to the forward reference frame, the first frame (P(4)-frame) of the PB(4)-frame is decoded and assigned to the backward reference frame, and the second frame (B(4)-frame) of the PB(4)-frame is stored in the frame buffer. Next, the B(5)-frame is acquired and the frame buffer has the previously stored B(4)-frame at present, so the B(4)-frame is decoded and output and the B(5)-frame is stored in the frame buffer. Next, the $P_e(6)$-frame is acquired and the frame buffer has the previously stored B(5)-frame at present, so the B(5)-frame is decoded and output and the frame buffer is emptied.

Next, the I(7)-frame is acquired, the decoded backward reference frame (P(4)-frame) is output and assigned to the forward reference frame, and the I(7)-frame is decoded and assigned to the backward reference frame. Next, the PB(8)-frame is acquired, the decoded backward reference frame (I(7)-frame) is output and assigned to the forward reference frame, the first frame (P(8)-frame) of the PB(8)-frame is decoded and assigned to the backward reference frame, and the second frame (B(8)-frame) of the PB(8)-frame is stored in a frame buffer. Next, the B(9)-frame is acquired and the frame buffer has the previously stored B(8)-frame at present, so the B(8)-frame is decoded and output and the B(9)-frame is stored in the frame buffer. Finally, the $P_e(10)$-frame is acquired and the frame buffer has the previously stored B(9)-frame at present, so the B(9)-frame is decoded and output and the frame buffer is emptied. The $P_e(10)$-frame is the last frame of the input bitstream data and the frame buffer has no previously stored B-frame at present. Then, the decoded backward reference frame (P(8)-frame) is output, and the decoding process terminates. Thus, an output bitstream data represented as "I(0) B(1) B(2) P(1) B(4) B(5) P(4) I(7) B(8) B(9) P(8)" is acquired.

Embodiments of the invention disclose video decoding methods, utilizing self-determined decoding rules for decoding video data encoded by any other encoder. Embodiments of the invention further provide a frame buffer for temporarily storing a B-frame, correctly decoding MPEG-4 format files and effectively rising system stability and reducing hardware cost.

Although the present invention has been described in preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A video decoding method, comprising: defining a backward reference frame in a backward reference buffer, a forward reference frame in a forward reference buffer, and a frame buffer; acquiring a frame from video data to a decoding unit; determining a frame type of the frame; when the frame is a bidirectional predicted frame (B-frame) and the frame buffer has a previously stored B-frame, decoding and outputting the previously stored B-frame by the decoding unit and storing the B-frame in the frame buffer; when the frame is a B-frame and no previously stored B-frame is present in the frame buffer, decoding and outputting the B-frame by the decoding unit; when the frame is a combined frame comprising both a P-frame and a B-frame or an I-frame and a B-frame, decoding and outputting the backward reference frame and storing the B-frame of the combined frame in the frame buffer, when the frame is the P-frame not comprising video data and the frame buffer has a previously stored B-frame, decoding and outputting the previously stored B-frame; and when the frame is the P-frame not comprising video data and no previously stored B-frame is present in the frame buffer, outputting the decoded backward reference frame.

2. The video decoding method as claimed in claim 1, wherein the frame acquisition further comprises: determining whether the frame is the first frame of the video data; and when the frame is the first frame of the video data, assigning the frame to the backward reference frame and the forward reference frame respectively.

3. The video decoding method as claimed in claim 2, further comprising decoding and outputting the backward reference frame when the frame is an intra-frame (I-frame) or a predicted frame (P-frame).

4. The video decoding method as claimed in claim 1, further comprising: determining whether the frame is the last frame of the video data; when the frame is the last frame of the video data and the frame buffer has a previously stored B-frame, decoding and outputting the previously stored B-frame; and when the frame is the last frame of the video data, outputting the decoded backward reference frame.

5. A video decoding method, comprising: acquiring a first frame of video data to a decoding unit; assigning the first frame to a backward reference frame in a backward reference buffer and a forward reference frame in a forward reference buffer respectively and emptying a frame buffer; acquiring the next frame of the video data to the decoding unit; determining a frame type of the next frame; and implementing corresponding decoding operations by the decoding unit according to the determining result, and when the next frame is a B-frame, temporarily storing the next frame in the frame buffer, wherein when the frame is a combined frame comprising both a P-frame and a B-frame or an I-frame and a B-frame, decoding and outputting the backward reference frame, assigning the backward reference frame to the forward reference frame, assigning a first frame of the combined frame to the backward reference frame, and storing a second frame of the combined frame in the frame buffer, and when the frame is the P-frame no comprising video data, determining whether the frame buffer has a previously stored B-frame, when the frame buffer has the previously stored B-frame, decoding and outputting the previously stored B-frame; emptying the frame buffer, and when no previously stored B-frame is present in the frame buffer, outputting the decoded backward reference frame.

6. The video decoding method as claimed in claim 5, the decoding operation implementation further comprises: when the frame is an I-frame or a P-frame, outputting the decoded backward reference frame; assigning the backward reference frame to the forward reference frame; assigning the frame to the backward reference frame; and emptying the frame buffer.

7. The video decoding method as claimed in claim 6, the decoding operation implementation further comprises: when the frame is the B-frame, determining whether the frame buffer has a previously stored B-frame; when the frame buffer has the previously stored B-frame, decoding and outputting the previously stored B-frame; storing the frame in the frame buffer; and when no previously stored B-frame is present in the frame buffer, decoding and outputting the frame.

8. The video decoding method as claimed in claim 5, further comprising: determining whether the frame is the last frame of the video data; when the frame is the last frame of the video data, determining whether the frame buffer has a previously stored B-frame; when the frame buffer has the previously stored B-frame, decoding and outputting the previously stored B-frame, and emptying the frame buffer; and besides, outputting the decoded backward reference frame.

9. A video decoding device implementing decoding operations to video data, comprising: a backward reference buffer, storing a frame; a forward reference buffer, storing a frame; a frame buffer, storing a frame; a buffer controller, storing frames to the backward reference buffer, forward reference buffer, and frame buffer respectively; and a decoding unit, coupled to the buffer controller, determining the type of frames acquired from the video data, implementing corresponding decoding operations according to the determined result, and outputting the decoded frame, wherein the frame is temporarily stored in the frame buffer when the frame is a B-frame, wherein when the frame is a combined frame comprising both a P-frame and a B-frame or an I-frame and a B-frame, the decoding unit decodes and outputs the iatema4 frame of the backward reference buffer, and the buffer controller stores the internal frame of the backward reference buffer in the forward reference buffer, a first frame of the combined frame in the backward reference buffer, and a second frame of the combined frame in the frame buffer, and the decoding unit determines whether the frame buffer has a previously stored B-frame when the frame is a P-frame not comprising video data, the decoding unit decodes and outputs the previously stored B-frame when the frame buffer has the previously stored B-frame; the buffer controller empties the frame buffer, and the decoding unit decodes and outputs the frame of the backward reference buffer when no previously stored B-frame is present in the frame buffer.

10. The video decoding device as claimed in claim 9, wherein when the frame is the first frame of video data, the decoding unit stores the frame to the backward reference buffer and the forward reference buffer respectively.

11. The video decoding device as claimed in claim 10, wherein the decoding unit outputs an internal frame of the backward reference buffer and decodes the Jatema4 frame, when the frame is an I-frame or a P-frame, and the buffer controller stores the internal frame of the backward reference buffer in the forward reference buffer, stores the frame in the backward reference buffer, and empties the frame buffer.

12. The video decoding device as claimed in claim 11, wherein the buffer controller determines whether the frame buffer has a previously stored B-frame when the frame is the B-frame, the decoding unit decodes and outputs the previously stored B-frame when the frame buffer has the previously stored B-frame, the buffer stores the frame in the frame buffer, and the decoding unit decodes and outputs the frame when no previously stored B-frame is present in the frame buffer.

13. The video decoding device as claimed in claim 9, wherein the decoding unit determines whether the frame is the last frame of the video data, the buffer controller determines whether the frame buffer has a previously stored B-frame when the frame is the last frame of the video data, the decoding unit decodes and outputs the previously stored B-frame, and emptying the frame buffer when the frame buffer has the previously stored B-frame, and decodes and outputs the internal frame of the backward reference buffer when no previously stored B-frame is present in the frame buffer.

* * * * *